United States Patent Office 3,657,413
Patented Apr. 18, 1972

3,657,413
ANTISEPTIC COMPOSITION CONTAINING PEROXIDE, GLYCEROL, AND CARBOXYPOLYMETHYLENE POLYMER
Murray W. Rosenthal, East Brunswick, N.J., assignor to Block Drug Company, Inc., Jersey City, N.J.
No Drawing. Filed Aug. 28, 1969, Ser. No. 853,953
Int. Cl. A61k 27/00
U.S. Cl. 424—81         5 Claims

ABSTRACT OF THE DISCLOSURE

An antiseptic composition containing a peroxide, glycerol, and a carboxypolymethylene polymer. The carboxypolymethylene polymer thickens and imparts sustained release properties to the composition, which is useful for antiseptic treatment of oral soft tissues, wounds, and the like.

BACKGROUND OF THE INVENTION (1) Field of the invention

The invention relates to an antiseptic composition comprising urea peroxide, glycerol, and a carboxypolymethylene polymer.

(2) Prior art

Hydrogen peroxide is a well known antiseptic which has been extensively employed in aqueous solution for the treatment of infectious processes in both human and veterinary topical therapy. The agent can be used in its original form after suitable dilution, or it can be derived from those solid compounds which form salts or additive compounds with hydrogen peroxide. Included among these are sodium perborate, sodium carbonate peroxide, sodium peroxyphosphate, urea peroxid, potasium persulfate, and others. When added to water, these compounds hydrolyze into hydrogen peroxide and the corresponding carrying salt.

Although extensively employed for treating all parts of the body, hydrogen peroxide has proved especially valuable for treating the mucous membranes of the oral cavity. Partly as a consequence of oxygen tissue metabolic and reparative requirements (by a mechanism which is not clearly understood), partly as a consequence of its broad antibacterial effects against gram positive and gram negative cocci, bacillus and spirochetal forms as well as many varieties of yeasts and fungi, and partly because of its cleaning and hemostatic effects, hydrogen peroxide is extensively recommended and used for bacterial and viral infections and for tissue inflammations of non-microorganic origin.

The principal limitation of commonly used peroxide aqueous solutions, however, is their brief period of contact and function on oral tissues. Since many oral bacteria, as well as saliva, contain high concentrations of the enzyme catalase and other peroxidases, the hydrogen peroxide is rapidly decomposed into gaseous oxygen and water. It is a well known fact that the antibacterial effects of peroxide are exercised only at the instant that the peroxide decomposes to release nascent oxygen. The gaseous oxygen molecules subsequently formed by combination of the nascent oxygen atoms have no antibacterial effects or tissue oxygenating potential. Thus, there is only transitory contact of the active oxygenating agent with the affected tissues. Furthermore, the low viscosities of water solutions of hydrogen peroxide itself and the water solutions of hydrogen peroxide-additive salts, do not allow the active material to stay in contact with affected tissues for as long as is desirable because of the constant flushing effects of salivary secretions. This tendency toward rapid decomposition of $H_2O_2$ into gaseous oxygen and water and the rapid removal of peroxide solutions has severely limited their application to, and utility on, oral tissues.

It would be highly desirable, therefore, to extend the period of oxygen release from hydrogen peroxide for considerably longer periods, as well as to increase the period of retention on tissues.

A partial solution to these problems of rapid decomposition and brief tissue contact relies on the use of urea peroxide dissolved in glycerol, as described in U.S. Pat. 2,430,450, but even this composition is capable of being held on oral tissues for only a few minutes at most before it, too, is decomposed and flushed away by the secretion and flow of saliva in the mouth.

It is, therefore, among the objects of the present invention to provide an antiseptic composition useful, inter alia, for the treatment of oral soft tissue inflammation, which is capable of being retained on oral tissue for extended periods of time and which exhibits the valuable property of sustained or prolonged release of nascent oxygen.

SUMMARY OF THE INVENTION

The antiseptic composition of the invention comprises urea peroxide as a source of hydrogen peroxide in a slowly dispersible solvent made of glycerol which is thickened with a glycerol-soluble polymer. The objectives of imparting high viscosity characteristics to the glycerol carrier in the invention, and of achieving prolonged release of nascent oxygen, are obtained by the use of a carboxypolymethylene polymer, and preferably by the use of the glycerol-soluble neutralized salts of such a polymer.

It has been disclosed that carboxypolymethylene polymers are effective agents for thickening glycerol (for instance, see Cohen, pages 42 et seq., "Soap and Chemical Specialties," November 1956). In accordance with the present invention, however, it has been found that, not only do carboxypolymethylene polymers serve as effective thickening agents for solutions of urea peroxide in glycerol but, surprisingly, these polymers impart sustained nascent oxygen release effects to such solutions and, moreover, impart greater tissue adherence characteristics thereto.

The carboxypolymethylene polymers useful in the composition of the present invention are well known, typical types of which being disclosed, for example, in U.S. Pats. Nos. 2,798,053; 2,858,281; 2,923,692; and 2,985,625, the disclosures of which are incorporated herein by reference. Preferably, the carboxypolymethylene polymers utilized herein are of the type described in the aforesaid Pat. No. 2,798,053, and comprise interpolymers of a major proportion of one or more alpha, beta-olefinically unsaturated carboxylic acids, and a minor proportion of a polyalkenyl polyether of a polyol, suitably a polyallyl ether of a polyhydric alcohol containing at least three hydroxyl groups.

Among the specific illustrative alpha,beta-olefinically unsaturated carboxylic acids described in the aforesaid Pat. No. 2,798,053, and which may be employed to produce the carboxypolymethylene polymers useful herein, are acrylic acid, methacrylic acid, maleic anhydride, and the like. Examples of useful polyallyl polyethers of polyols include the allyl ethers having an average of at least two allyl groups per molecule of the following alcohols; sucrose, sorbitol, glucose, mannitol, pentaerythritol, 1,2,3-butanetriol, xylitol, and the like. Additional monomers may be included in the polymer, if desired. Such other monomers include vinyl acetate, acrylamide, vinyl pyrrolidone, and the like.

Carboxypolymethylene polymers useful in the antiseptic compositions of the invention are available commercially under the trade designation "Carbopol."

PREFERRED EMBODIMENTS OF THE INVENTION

The preferred antiseptic compositions of this invention comprise urea peroxide, glycerol, and the carboxypolymethylene polymer or salt thereof, the latter being incorporated in the formulation in an amount sufficient to provide a gel having a viscosity of at least about 1000 centipoises at room temperature.

The glycerol used in the composition is preferably anhydrous in order to impart maximum chemical stability to the active urea peroxide agent. However, water in an amount of up to 10% of the composition may also be present if it is desired, for example, to incorporate auxiliary agents in the composition which may have only limited solubility in glycerol but greater water solubility. Whenever water is so utilized in the composition it is desirable, though not essential, to simultaneously incorporate a peroxide stabilizing agent therein. Such agents, and their mode of use are known. Examples of peroxide stabilizers so useful include phenacetin, acetanilide, 8-hydroxyquinoline, stannous salts, ethylenediaminetetraacetic acid derivatives and the like.

The preferred carboxypolymethylene polymers incorporated in such compositions are copolymers of from 97.5 to 99.8 percent by weight of acrylic acid and from 0.2 to 2.5 percent by weight of polyallyl sucrose having at least two allyl groups per sucrose molecule. Desirably, such polymers are employed as the neutral salts thereof. By "neutral" is meant that the pH of a 1 weight percent water solution of the salt of the polymer has a pH of from about 5 to about 9, and preferably from about 6 to about 8.

Glycerol-soluble neutralizing agents which can be employed to form the salts of the carboxypolymethylene polymers include the various alkanolamines such as monoethanolamine, diethanolamine, triethanolamine and triisopropanolamine; alkali metal hydroxides such as sodium hydroxide and potassium hydroxide; pyridine, other amines and other glycerol-soluble alkaline agents. Use of the ethanolamines is preferred.

It is possible to add to the antiseptic compositions of the invention, if desired, other glycerol-soluble components intended to serve various functions. Peroxide stabilizers, such as 8-hydroxyquinoline, can, as noted above, also be added. Ethanol or water may serve as part of the composition, if desired, as co-solvents for other compounds. Therapeutically acceptable dyes and/or flavoring agents can also be added to the formulation. In fact, any agent which is soluble in glycerol or in glycerol mixtures as described, is non-toxic at the levels used, does not detract from the homogeneity or optical clarity of the finished product, and which does not reduce the inherently high stability of the urea peroxide in glycerol, can be incorporated, if desired.

The proportions of the components of the composition of the invention can be varied within relatively wide limits. In general, the urea peroxide is used in therapeutically effective proportions, such as from about 3 weight percent to about 25 weight percent, based on the weight of the antiseptic composition. Levels below the lower limit specified will tend to release insufficient oxygen to achieve the desired therapeutic effect, while those concentrations above the upper limit specified begin to be incompletely soluble in the glycerol used as a carrier, and may be irritating to the oral tissue of users.

The concentrations of the neutralized carboxypolymethylene polymer may also be varied in order that the finished composition ranges in viscosity from a thickened syrup-like liquid of about 1,000 centipoises at room temperature (about 24° C.) to extremely stiff gels with viscosities of 500,000 or more centipoises at room temperature. The specific amounts of polymer to be employed in order to achieve the desired viscosity depends, in part, upon factors such as the exact nature of the polymer, presence or absence of other co-solvents in the glycerol composition, and the like. In general, however, amounts of from about 0.05 to about 5, preferably from about 0.1 to about 2, and more preferably from about 0.4 to about 1.5, weight percent (based on total weight of the antiseptic compositions) of polymer are employed.

The antiseptic compositions hereof are preferably formulated by initially thoroughly dispersing the carboxypolymethylene polymer into the glycerol and thereafter dissolving the urea peroxide and any further ingredients in the thickened solution, a clear homogeneous gel resulting. Thus, the powdered polymer may be slowly added to the glycerol while agitating the mixture with a stirrer, or the like. When the polymer is employed as the neutralized salt thereof, it is preferred to add the neutralizing agent to the mixture after the polymer has been dispersed and dissolved in the glycerol, and subsequent to addition of the urea peroxide and other adjuvants.

Typical examples of compositions prepared within the scope of this invention are described below; in each example, as well as in the preceding description, all parts and percentages are given by weight:

EXAMPLE 1

|  | Percent |
|---|---|
| Urea peroxide | 8.00 |
| Anhydrous glycerol | 85.30 |
| Carboxypolymethylene polymer [1] | 1.00 |
| Triethanolamine | 0.60 |
| Ethanol | 5.00 |
| Oil of peppermint | 0.10 |

[1] "Carbopol 934"—a copolymer of 99 percent acrylic acid and 1 percent polyallyl sucrose having an average of about 5.8 allyl groups per sucrose molecule.

The polymer is dispersed with high speed stirring in the glycerol in an atmosphere of reduced pressure. When dissolved, the urea peroxide, ethanol, and oil of peppermint are dissolved in the slightly thickened solution. Finally, the triethanolamine is incorporated with stirring, thus further thickening the composition. The resulting product is a clear, homogeneous, viscous gel. The composition is eminently satisfactory for the therapy of minor gingival inflammations and for the antiseptic treatment of oral soft tissue infections.

EXAMPLE 2

|  | Percent |
|---|---|
| Urea peroxide | 11.00 |
| Carboxypolymethylene polymer [1] | 0.60 |
| Phenacetin | 0.05 |
| Mixed flavor | 0.05 |
| Triethanolamine | 0.40 |
| Anhydrous glycerol | 87.90 |

[1] "Carbopol 940"—a copolymer of acrylic acid and polyallyl sucrose having an average of about 5.8 allyl groups per sucrose molecule.

The preparation is made in the same manner as detailed for Example 1 to form a clear, homogeneous, viscous gel suitable for the treatment of oral infections.

The more prolonged oxygen release rates achieved by use of the compositions of this invention as compared with those obtained employing simple solutions of urea peroxide in glycerol, have been demonstrated by both in vitro and in vivo techniques, as described below:

In vitro tests

The oxygen-release characteristics of the composition described in Example 2 were compared with those of a simple solution of 11 percent urea peroxide in anhydrous glycerol by a technique wherein either 25 ml. of a .002% solution of lyophilized catalase or 25 ml. of pooled human saliva was placed in a graduated cylinder. Exactly 0.3 cc. of the sample being studied was added and the graduate immediately capped with an inverted 10 ml. microburet. A soap film was created inside the buret, set at the zero mark, and observed to indicate the volume of oxygen liberated. A stop watch was started simultaneously with the sample addition, and the gas volume recorded at one minute intervals. The determinations using catalase solution were carried out until there was no further gas evolved, while those using saliva were terminated after approximately half the expected gas had evolved. Table I shows the volume of oxygen liberated by catalase with the composition of Example 2 and by the simple solution of 11 percent urea peroxide in glycerol.

TABLE 1

[Cc. of oxygen liberated by in vitro catalase treatment]

| Time (minutes) | Example 2 composition | Urea peroxide- glycerol |
|---|---|---|
| 0 | 0.00 | 0.00 |
| 5 | 2.63 | 4.20 |
| 10 | 3.82 | |
| 15 | 4.38 | |
| 20 | 4.62 | |

It can be observed that the composition of Example 2 produced oxygen continuously for a 20 minute period while the simple solution of urea peroxide in anhydrous glycerol had lost all of its oxygen at the end of 5 minutes. The prolonged oxygen release exhibited by the composition of Example 2 indicates the utility of such a composition in inducing extended therapeutic effects on oral soft tissue.

Table II indicates the results of a similar study, in which human saliva rather than the catalase solution was utilized to release oxygen from the above test formulation.

TABLE II

[Cc. of oxygen liberated by in vitro saliva treatment]

| Time (minutes) | Example 2 composition | Urea peroxide- glycerol |
|---|---|---|
| 0 | 0.00 | 0.00 |
| 10 | 0.05 | 0.60 |
| 20 | 0.20 | 1.80 |
| 30 | 0.45 | 2.13 |
| 40 | 0.70 | |
| 50 | 1.00 | |
| 60 | 1.35 | |
| 70 | 1.70 | |
| 80 | 2.00 | |

Again, it will be noted that the composition of Example 2 continued releasing oxygen for periods considerably longer than the oxygen-release time period observed for the urea peroxide in glycerol.

In vivo tests

An in situ investigation also has been conducted to study the combined adherence to human oral tissue and oxygen release characteristics of the antiseptic compositions of this invention. Five volunteer subjects had a premeasured amount of the composition described in Example 2 applied to the oral mucosa on their mandibular gingiva in the area of the first bicuspid tooth. Exactly one minute later the area of application was carefully wiped with a cotton swab to remove as much as possible of the originally applied product, still present as a residue. The entire cotton swab was then dropped into a test tube containing dilute, acidified potassium permanganate, which was then thoroughly swirled. Decolorization of the permanganate indicated that some applied product was still present and that it still had a measurable quantity of available oxygen present. After the procedure had been completed, it was repeated at a later time except that the area of application was not swabbed until two minutes after application had elapsed. At a later time, the procedures were repeated after 3 minutes, and then after 4 minutes, and so on, until the time period was reached when the swab no longer decolorized the permanganate.

In a like manner, an additional five subjects were subjected to a similar test in which, in lieu of the composition of Example 2 hereof, a simple solution of 11 percent urea peroxide in anhydrous glycerol was applied to their gingivae. The procedure outlined above was repeated until a time period was reached at which the swab no longer decolorized the permanganate reagent.

The five subjects in each group were then reversed and subjected to treatment with the product not previously employed. At the conclusion of the study each subject had been identically treated with each product. Table III shows the duration of tissue adherence and continuing oxygen release for each subject with the composition of Example 2 and with the solution of urea peroxide in glycerin. A "plus" reading at 1 minute but not at 2 minutes is recorded as "1.5" in the table; that at 4 minutes but not at 5 minutes is recorded as "4.5," etc.;

TABLE III

[Persistence of oxygenating effects on oral tissue]

| | Duration of effect in minutes | |
|---|---|---|
| Subject | Example 2 | Urea peroxide- glycerol |
| 1 | 5.5 | 1.5 |
| 2 | 5.5 | 0.5 |
| 3 | 5.5 | 1.5 |
| 4 | 7.5 | 1.5 |
| 5 | 3.5 | 1.5 |
| 6 | 4.5 | 1.5 |
| 7 | 5.5 | 2.5 |
| 8 | 4.5 | 0.5 |
| 9 | 6.5 | 3.5 |
| 10 | 6.5 | 3.5 |
| Average | 5.5 | 1.8 |

It may be noted that the average duration of effective oxygen action at the site of application on human oral mucous membranes was more than three times as long, and that each participant in this controlled study demonstrated considerably longer retention, for the composition of Example 2 than was observed for a simple solution of urea peroxide in anhydrous glycerol. Similar effects can be expected when the respective products are used for therapeutic purposes.

It will be noted that, while the preceding illustrative formulations all incorporated Carbopol, it is within the scope of the present invention to utilize any of the above described carboxypolymethylene polymers in the antiseptic compositions hereof, to markedly improve the oxygen release and tissue adherence characteristics thereof. Other modifications of the novel compositions of the invention will similarly occur to those skilled in the art.

What is claimed is:

1. An antiseptic composition, comprising a clear, homogeneous gel incorporating:
    (a) from about 3 to about 25 weight percent urea peroxide;
    (b) from about 0.05 to about 5 weight percent of a pharmaceutically acceptable neutral salt of a carboxypolymethylene polymer, said carboxypolymethylene polymer is an interpolymer of a major proportion of an alpha,beta-olefinically unsaturated carboxylic acid, and a minor proportion of a polyalkenyl polyether of a polyol, a 1 weight percent water solution of said salt having a pH of from about 5 to about 9;
    (c) from 0 to about 10% by weight water; and
    (d) the balance of the composition consisting essentially of glycerol;
        the amount of the carboxypolymethylene polymer salt being sufficient to impart a viscosity of from 1,000 to about 500,000 centipoises to said composition at 24° C.

2. The antiseptic composition of claim 1, wherein said carboxypolymethylene polymer is employed in the form of a neutral ethanolamine salt.

3. The antiseptic composition of claim 1, wherein said interpolymer is a copolymer of (a) acrylic acid, methacrylic acid, maleic anhydride, or maleic acid, and (b) a polyallyl polyether of a polyol having at least three hydroxyl groups, said polyether having an average of at least two allyl groups per molecule of polyol.

4. The antiseptic composition of claim 1, wherein said interploymer is a copolymer of from 97.5 to 99.8 percent by weight of acrylic acid and from 0.2 to 2.5 percent by weight of polyallyl sucrose having at least two allyl groups per sucrose molecule.

5. A method for the treatment of the mucous membranes of the oral cavity of a mammal with an antiseptic composition exhibiting prolonged nascent oxygen release and superior tissue adherence characteristics, which comprises administering to said mammal an effective amount of the antiseptic composition of claim 1.

References Cited
UNITED STATES PATENTS

| | | | |
|---|---|---|---|
| 2,430,450 | 11/1947 | Brown et al. | 424—322 |
| 2,798,053 | 7/1957 | Brown | 260—2.2 |
| 3,476,854 | 11/1969 | Molnar | 424—81 |

STANLEY J. FRIEDMAN, Primary Examiner

U.S. Cl. X.R.

424—322, 361